United States Patent [19]
Betremieux et al.

[11] Patent Number: 6,054,526
[45] Date of Patent: Apr. 25, 2000

[54] FINELY PARTICULATE COMPOSITE LATICES AND USE THEREOF IN SOLVENT-FREE PAINTS

[75] Inventors: Isabelle Betremieux, Beaumontel; Bruno Feret, Levallois; Christophe Verge, Beaumontel, all of France

[73] Assignee: Elf Atochem S.A., Puteaux, France

[21] Appl. No.: 09/000,063

[22] PCT Filed: Oct. 18, 1996

[86] PCT No.: PCT/FR96/01633

§ 371 Date: Jan. 20, 1998

§ 102(e) Date: Jan. 20, 1998

[87] PCT Pub. No.: WO97/15604

PCT Pub. Date: May 1, 1997

[30] Foreign Application Priority Data

Oct. 25, 1995 [FR] France ................................. 95/12568
Jul. 2, 1996 [FR] France ................................. 96/08226

[51] Int. Cl.$^7$ ....................................................... C08F 2/16
[52] U.S. Cl. ........................... 524/802; 524/800; 524/804
[58] Field of Search ................... 524/800, 802, 524/804

[56] References Cited

U.S. PATENT DOCUMENTS 4,868,259  9/1989  Burroway et al. .

FOREIGN PATENT DOCUMENTS 0 644 205   8/1994   European Pat. Off. .
2 060 662   5/1981   United Kingdom .
95/04767    2/1995   WIPO .

OTHER PUBLICATIONS

Database WPI, Section Ch, Week 8041, Derwent Publications Ltd., London, GB; Class A13, AN 80–72537C, XP002008042 & JP, A,55 112 215 (Sekisui Plastics KK), Aug. 30, 1980.

*Primary Examiner*—Edward J. Cain
*Attorney, Agent, or Firm*—Burns, Doane, Swecker & Mathis, L.L.P.

[57] ABSTRACT

Composite latex whose average particle size is between 30 and 150 nm, as these particles result from polymerization of a mixture hydrophobic monomers composed of styrene and (meth)acrylic esters to produce an emulsion in an aqueous solution of a water-soluble or water-dispersible amphiphilic copolymer having a molecular weight of between 500 and 5,000 and whose acid number of less than 500, said latex being composed of a combination of hydrophobic and hydrophilic monomers incorporating carboxylic acid functions in the presence of a radical-producing initiator, wherein said aqueous water-soluble amphiphilic polymer is free of any other surfactant or protective colloid and wherein the mass percentage of amphiphilic copolymer in relation to the dry extract of the latex between 10 and 50%.

11 Claims, No Drawings

FINELY PARTICULATE COMPOSITE LATICES AND USE THEREOF IN SOLVENT-FREE PAINTS

TECHNICAL FIELD

The present invention concerns the manufacture of composite latexes incorporating especially fine particle sizes, but without conventional surfactants, that is, non-polymeric surfactants, these latexes being intended for any application in which effective impregnation and the imparting of a degree of water-repellency are required.

Dispersion fineness is an imperative in such uses, since it determines the capacity of the dispersion to impregnate the substrate. The advantage of a latex whose particle size ranges between 30 nm and 150 nm is generally recognized.

PRIOR ART

The latexes whose use has become standardized in industry, for example those disclosed in German Patent Application No. DE 25 48393, consist of aqueous dispersions derived from the following successive operations:

1) Synthesis, in a solvent medium (mixable with water) of a prepolymer (hereinafter termed polymer A) based on a combination of hydrophobic and hydrophilic monomers carrying carboxylic acid functions; neutralization of the acid functions; and dilution of the polymer A in water.

2) Emulsion-producing polymerization of a mixture of hydrophobic monomers (B monomers) composed of styrene and of (meth)acrylic esters in the medium produced in step 1, above.

However, interference effects produced in these emulsions may occur: among others, water-sensitivity of the emulsion after film formation caused therein by the presence of surfactants, most notably non-polymeric, non-ionic surfactants such as ethoxylated fatty alcohols, or anionic polymeric surfactants, such as sodium oleate or sodium laurylsulfate, as mentioned, for example, in the process disclosed by U.S. Pat. No. 4,868,259 (Goodyear). Furthermore, the law now tends to remove from the marketplace those products which contain volatile organic solvents. Now, implementation of polymerization techniques according to prior art makes it impossible, first, in the polymer A preparation phase, to avoid the use of solvents, which remain in the preparation, and second, to obtain equally fine particle sizes without using very sizable quantities of non-polymeric surfactants.

STATEMENT OF THE INVENTION

The composite latexes according to the invention fulfill these requirements. These latexes, whose average particle diameter is between 30 and 150 nm, are produced by polymerization of a mixture of ethylenically-unsaturate hydrophobic monomers, for example a mixture of styrene and (meth)acrylic esters, into an emulsion in an aqueous solution of a water-soluble or water-dispersible amphiphilic polymer have a number-average molecular weight (Mn) of between 500 and 5,000 and whose acid number is less than 500, a polymer which is itself composed of a combination of ethylenically-unsaturate hydrophobic monomers and ethylenically-unsaturate hydrophilic monomers incorporating carboxylic acid functions, said aqueous water-soluble amphiphilic polymer solution being free of any other surfactant or protective colloid. This polymer, whose molecular weight is very substantially lower than those of the polymers A according to prior art will hereinafter, and for simplicity of language, be termed "the oligomer." Polymerization is carried out in the presence of a radical-producing initiator.

Latexes of this type were disclosed in EP-A-675177 (Goodrich). The latexes according to the invention have a mass percent of amphiphilic oligomer in relation to the final dry extract of between 10 and 50%, a level constituting a compromise between the conflicting properties of the oligomers and those of the monomers undergoing polymerization, by virtue of which compromise there is now available a finely-particulate dispersion which is stable over time and whose coalescent films are not overly sensitive to water. Analysis of the latexes obtained according to the invention show that their free oligomer percentage is less than the level that would be expected if this oligomer had functioned solely as a monomer dispersant or as a protective colloid. One portion of this oligomer is quite clearly incorporated into the particles which form the dispersed phase of the latex. This supposition is confirmed by measuring the transition temperature of the products obtained, a temperature which differs appreciably from that which would be expected from the simple copolymer of the hydrophobic monomers undergoing polymerization in the amphiphilic oligomer solution. Quantitative analysis of the aqueous phase of the dispersion, which is free of latex particles and which is produced following high-speed centrifugation, also confirms this hypothesis, since only a portion of the initial oligomer is present in the aqueous phase after this centrifugation operation. In this way, a portion of the starting oligomer fixes to the latex particles, and, because of this fact, the latexes according to the invention are termed composite latexes.

In these systems, the hydrophobic monomers undergoing polymerization in the amphiphilic oligomer solution may be either styrene or the derivatives thereof, a (meth)acrylic ester, including fluorinated monomers derived from the esterification of (meth)acrylic acid using a perfluorinated alcohol, or a mixture of these monomers.

The amphiphilic oligomer is preferably a copolymer of one or several hydrophobic monomers from the group comprising styrene or the derivatives thereof, isobutylene or the derivatives thereof, and (meth)acrylic esters, and one or several hydrophilic monomers from the group comprising (meth)acrylic acid and maleic anhydride, the latter being potentially modified by an alcohol or an amine, provided that, in this modified form, it remains water-soluble or water-dispersible in an aqueous medium. Preference is reserved for styrene/maleic anhydride copolymers whose maleic anhydride component is partially modified or unmodified by an alcohol or an amine and whose acid number lies between 150 and 500, and preferably between 200 and 300. These copolymers are obtained according to the mass copolymerization technique described in U.S. Pat. No. 3,085,994 (Sinclair). The moderate acid number requirement (maximum of 500) may be met by using copolymers containing a limited percentage of maleic anhydride. Use may also be made of resins modified by esterification or partial amidation of the maleic anhydride. As regards partial esterification, preference is given to C3–C18 linear aliphatic alcohols, cyclic alcohols such as cyclohexanol, or alcohols produced by etherification of ethylene or propylene glycol. As regards the modifying amines, preference is given to C3-C 18 aliphatic amines or cyclic amines, such as cyclohexamine, or, alternatively, amines which incorporate both a primary and a tertiary amine, such as dimethylaminopropylamine.

Emulsion polymerization of the hydrophobic monomers is carried out conventionally in the presence of water-soluble initiators, such as ammonium, potassium, or sodium persulfates, or in the presence of hydrogen peroxide and oxidation-reduction catalysts. The polymerization temperature is between 40 and 90° C., and preferably between 65 and 85° C. The solid material concentration ranges between 20 and 60%, and preferably between 25 and 45%. Polymerization can be carried out using a sealed reaction vessel or by implementing a semi-continuous technique. In the first instance, the monomers and the initiator are placed in their entirety in the oligomer A solution at the start of polymerization, and the medium is kept at constant temperature while stirring for a period of between 2 and 4 hours. In the second instance, two dosing pumps authorize the continuous feed, the one, of the monomer mixture, and the other, of the initiator solution, into the oligomer solution which is stirred continuously and kept at constant temperature. The monomers and the initiator are added within a period of between 30 minutes and 4 hours, depending on the quantity and nature of the monomers to be added. When the monomers and the initiator have been poured in, the medium is stirred continuously and kept at constant temperature for between 0 and 4 hours, so as to complete polymerization of the monomers.

The fineness of the dispersion of the composite latexes according to the invention, as well as the absence of any surfactant in the formulation hereof, makes them highly prized in various fields in which effective impregnation of a substrate and a degree of water-repellency are required: bulk or surface adhesive bonding of paper; leather finishing; textiles processing; paints and surface coatings for wood; paints for concrete, cement, plaster, tiles, and metals; additives for cements and mortars, inks and overprint inks and varnishes; adhesives for floor tiles, additives for cement and mortar; non-pigmented coatings for leather, metal, and plastics. They form, most notably, excellent bulk or surface paper-bonding agents and excellent solvent-free paint-formulation auxiliaries. The invention also concerns solvent-free paints which incorporate these composite latexes as film-forming auxiliaries.

EXAMPLES

In the following examples, particle size was measured using a Coulter N4SD apparatus. The molecular weights were calculated by GPC in a THF+5% acetic acid solvent medium on "PL-Gel" chromatographic columns.

Example 1
Prior Art (Example 7 of Pat. No. DE 2,548,393)

22.62 g acrylic acid, 40 g isopropanol, 80 g styrene, and 55 g of a dimethylformamide solution containing 15 g maleic anhydride and 3 g azoisobutyronitrile (AIBN) were fed in succession into a glass three-necked 3-liter reaction vessel equipped with a mechanical stirrer.

The mixture was heated to 80° C. under nitrogen and while stirring, and was kept under these conditions for 5 hours. At the end of this period, 650 ml of water and 45 ml of a 28% ammonia solution were added. This mixture dissolved in about 15 minutes at 70° C. Next, 15 g sodium oleate were added to this solution.

Copolymer A having been produced in this way, a mixture of 130 g styrene, 150 g butyl acrylate, and a solution of 5 g $(NH_4)_2S_2O_8$ in 100 g water were added thereto continuously at 85° C., under nitrogen and while stirring over about two hours, using a dosing pump.

The reaction medium was kept for an additional 2 hours at 85° C., then cooled while stirring non-vigorously. In this way, a composite latex having the following characteristics was obtained:

Dry extract: 35.5%

Brookfield viscosity at 23° C.: 9,400 mPa.s pH: 8.5

Average particle diameter: 434 nm.

The adverse properties of the composite latex obtained in this example may be noted:

large particle size>100 nm, presence of surfactant, presence of organic solvent.

Example 2
(according to the invention)

1,269 g of an oligomer having a molecular weight of 1,900 composed of 74.3% by weight styrene and 25.7% by weight maleic anhydride, 6.825 g demineralized water, and 500 g 28% ammonia in water were fed in succession into a glass three-necked 20-liter reaction vessel equipped with a mechanical stirrer. All of the reagents were heated to 60° C. and stirred continuously until dissolution of the oligomer. The mixture was heated to 85° C., then a mixture of 1,374 g styrene, 1,587 g butyl acrylate, and a solution of 52.9 g $(NH_4)_2S_2O_8$ in 1,057 g were added continuously over two hours using dosing pumps at 85° C. under nitrogen and while stirring to the oligomer solution prepared as before. The reaction medium was kept for an additional 2 hours at 85° C., then cooled while stirring non-vigorously.

A composite latex having the following characteristics was obtained:

Dry extract: 23.5%

Brookfield viscosity at 23° C.: 20 mPa.s pH: 8.85

Average particle diameter: 55 nm.

Tg: 25° C.

The fineness of the particle size as compared with that in Example 1 according to prior art can be seen. It will also be noted that the Tg differs substantially from that of the styrene/butyl acrylate copolymer which was polymerized under the same conditions, but without any oligomer, which is covered under Example 3.

Example 3
(Control)

This example is intended to show the essential contribution the oligomer makes to the final properties of the composite latex. It is produced under the same conditions as those in Example 2, but in the presence of conventional non-polymeric surfactants in order to fulfill the dispersant function assigned to the oligomer according to the invention.

14,919 g demineralized water, 80.13 g polyethylene glycol isotridecylether and 32.04 g polyethylene glycol sodium sulfate lauryl ether were fed in succession into a glass three-necked 20-liter reaction vessel. The reagents were stirred at ambient temperature until a homogeneous solution was obtained.

After dissolution, the mixture was heated to 85° C. and, under nitrogen and while stirring, a mixture of 1,374 g styrene, 1,587 g butyl acrylate, and a solution of 52.9 g $(NH_4)_2S_2O_8$ in 1,057 g water was added continuously over two hours. The reaction medium was kept for another 2 hours at 85° C., then cooled while stirring non-vigorously. A latex having the following properties was obtained:

Dry extract: 19.5%

Brookfield viscosity at 23° C.: 15 mPa.s pH: 1.85

Average particle size: 293 nm

Tg=15° C.

It will be noted that, despite the relatively sizable quantities of conventional surfactants in relation to the monomers, an especially fine particular dispersion was not produced.

Example 4

This example and the one that follows are intended to show the flexible nature of the polymerization according to the invention of the monomers used. 1,269 g of the same oligomer used in Example 2, 6,825 g demineralized water, and 500 g 28% ammonia in water were fed into a glass three-necked 20-liter reaction vessel equipped with a mechanical stirrer. The reagents were heated to 60° C. and stirred continuously until dissolution of the dispersant-effect copolymer of low molecular weight. The solution was heated to 85° C. and, under nitrogen and while stirring, a mixture of 1,586 g styrene, 687 g butyl acrylate, 687 g isobutyl acrylate, and a solution of 52.9 g $(NH_4)_2S_2O_8$ in 1,057 g water was added continuously over two hours. The reaction medium was kept at 85° for another two hours, then cooled while stirring non-vigorously.

A latex possessing the following properties was obtained:

Dry extract: 23.4%

Brookfield viscosity at 23° C.: 15 mPa.s pH: 8.8

Average particle size: 54 nm.

Example 5

120 g of the oligomer used in Example 2, 1,150 g demineralized water, and 47.5 g 28% ammonia in water were fed in succession into a glass three-necked 3-liter reaction vessel equipped with a mechanical stirrer. The reagents were heated to 60° C. and stirred continuously until dissolution of the dispersant-effect copolymer having low molecular weight. The reagents were heated to 60° C. and stirred continuously until dissolution of the oligomer. Next, the solution was heated to 85° C. under nitrogen and while stirring, then a mixture of 140 g styrene, 70 g butyl acrylate, 70 g 2-ethylhexyl acrylate, and a solution of 5 g $(NH_4)_2S_2O_8$ in 100 were added continuously over two hours. The reaction medium was kept for another two hours at 85° C., then cooled while stirring non-vigorously.

A latex having the following properties was obtained:

Dry extract: 24.5%

Brookfield viscosity at 23° C.: 15 mPa.s pH: 8.8

Average particle size: 46 nm.

Example 6

This example demonstrates the possible use as oligomer of a esterified styrene/maleic anhydride copolymer having a low molecular weight.

120 g of an oligomer (molecular weight: 1,900) composed of 66.5% by weight styrene and 33.5% by weight maleic anhydride partially modified by n-propanol, 1,150 g demineralized water, and 32.5 g 28% ammonia in water were fed in succession into a glass three-necked 3-liter reaction vessel equipped with a mechanical stirred. The reagents were heated to 60° C. and stirred continuously until dissolution of the oligomer. Next, the solution was heated to 85° C. under nitrogen and while stirring, then a mixture of 130 g styrene, 150 g butyl acrylate, and a solution of 5 g $(NH_4)_2S_2O_8$ in 100 g water were added continuously over two hours. The reaction medium was kept for another two hours at 85° C., then cooled while stirring non-vigorously.

A latex having the following properties was obtained:

Dry extract: 24.5%

Brookfield viscosity at 23° C.: 20 mPa.s pH: 8.8

Average particle size: 85 nm.

Example 7

(comparative example)

This example used as a comparison to Example 2 is intended to show the influence of the molecular weight of the oligomer on the dispersion properties.

120 g of an oligomer (molecular weight: 10,000) composed of 74.3% by mass styrene and 25.7% by mass maleic anhydride, 1,150 g demineralized water, and 32.5 g 28% ammonia in water were fed in succession into a glass three-necked 3-liter reaction vessel equipped with a mechanical stirrer. The reagents were heated to 60° C. and stirred continuously until dissolution of the oligomer. Next, the solution was heated to 85° C. under nitrogen and while stirring, then a mixture of 130 g styrene, 150 g butyl acrylate, and a solution of 5 g $(NH_4)_2S_2O_8$ in 100 g water were added continuously over two hours. The reaction medium was kept for another two hours at 85° C., then cooled while stirring non-vigorously.

A latex having the following properties was obtained:

Dry extract: 24.5%

Average particle size: 234 nm.

It will be noted that, although the starting oligomer had the same chemical composition as that in Example 2, the difference in molecular weights between the two oligomers gave dispersions having quite different properties, in particular as regards particle size.

Example 8

Use in formulating solvent-free paints.

Two paints were formulated using the following composition:

| | |
|---|---:|
| Water | 251.1 |
| Natrosol 250 HHR (cellulose thickening agent) | 4.0 |
| NOPCO (8034) anti-foaming agent | 2.2 |
| COATEX P90 (dispersing agent) | 1.9 |
| MERGAL KGN (bactericide) | 1.4 |
| TiO2 RL 68 (pigment) | 110.0 |
| LUZENAC 20MO (talc/filler) | 50.0 |
| HYDROCARB (CO3-Ca - filler) | 200.0 |
| DURCAL 5 (CO3Ca - filler) | 270.0 |
| Latex | 107.4 |
| NaOH (20% alkaline solution) | 2.0 |

The latexes used in these formulae were produced using the process described in Examples 4–6, the styrene/maleic anhydride containing 50.5% styrene and 49.5% maleic anhydride having a molecular weight of Mn=1,600 and an acid number of between 465 and 495. The compositions of the latexes are given in the following table, in which the latex according to prior art is taken from EP-675177 (already cited). The "properties" heading of the table shows one of the advantages of the latexes according to the invention as compared with one formulation according to prior art, which uses very high oligomer/dry extract ratios, this one advantage lying in the formulation of paints possessing a very low minimum film-forming temperature (MFT), which thus form a film easily in cold and temperate climates. The MFT is measured on a Coesfeld bench in accordance with the ISO 21/15 standard. For the comparative example, the MFT exceeds the experimental measurement capabilities.

| Constituents (weight) | Latex According to the Invention | Latex According to Prior Art |
|---|---|---|
| Resin | 240 | 520 |
| Water | 1,110 | 840.4 |
| 28% ammonia | 136.8 | 296.4 |
| Styrene | 207.2 | 103.6 |
| Butyl acrylate | 341.6 | 170.8 |
| Acrylic acid | 5.6 | 2.8 |
| Acrylamide | 5.6 | 2.8 |
| $(NH_4)_2S_2O_8$ | 10 | 5 |
| in water | 200 | 200 |

| Properties | | |
|---|---|---|
| Dry extract | 45.6 | 45.6 |
| Brookfield viscosity | 2,300 | 2,800 |
| pH | 8.55 | 9.75 |
| Average diameter | 127 nm | 72 nm |
| MFT | <0° C. | >73° C. |
| Outer Tg | 170° C. | 170° C. |
| Core Tg | 8° C. | 8° C. |

These matte paints were assessed for wet abrasion in accordance with the DIN 53778/2 standard on films measuring 90–100 µm in thickness, after drying for 8 days at 23° C. under 50% relative humidity. The results are given below:

| Latex | Strength in Cycles |
|---|---|
| According to the invention | 482 |
| According to prior art | 300 |

Example 9

Use in the formulation of solvent-free gloss paints.

Two paints were formulated as follows:

| | |
|---|---|
| Water | 137.9 |
| Natrosol Plus 430 (cellulose thickening agent) | 1.0 |
| NOPCO 8034 (anti-foaming agent) | 3.0 |
| COATEX P90 (dispersing agent) | 5.0 |
| ACTICIDE (bactericide) | 2.0 |
| TiO2 RHD2 (pigment) | 226.0 |
| LUZENAC 20MO (talc/filler) | 50.0 |
| DURCAL 2 (CO3-Ca - filler) | 61.6 |
| DURCAL 5 (CO3Ca - filler) | 41.1 |
| Latex | 516.1 |
| RHEOLATE 278 (thickening agent) | 5.1 |
| NH4OH (28% aqueous solution) | 1.0 |

The latexes used in these formulations are those in the preceding example (Example 8).

These gloss paints were characterized by measuring film-formation at 5° C., surface adhesiveness, and gloss at 60° C.

The ability of the paint to form a film at 5° C. was assessed in the following way. The paint formulation was applied to a glass plate in a thickness of 300 µm. The plate was then left at 5° under relative humidity of 70% for 18 hours, so that film formation could take place under extreme conditions of use. One hour after returning to ambient temperature (20° C. ), any cracking could be seen with the naked eye. Good film-forming ability can be deduced from an absence of cracks. Gloss was evaluated by the reflection of light at an angle of 60°, in accordance with the DIN 53778 standard.

Surface adhesiveness was evaluated as follows: The paint to the tested was applied on a Leneta black-and-white contrast card, using a dumbbell-shaped applicator Bird) and in a thickness of 200 µm. Six cards were prepared to conduct three trials. After drying for four hours in a climatic oven at 23° C. under 50% relative humidity, the cards were placed in contact with each other in pairs, painted surface against painted surface, and placed in a sandwich between two ground glass plates (75×100 mm). The sandwich was laid flat and a weight of 3,750 grams 50 g/cm³) was placed on it. This assembly was left in a room at 23° C., 50% relative humidity, for 24 hours. The pairs were then separated by pulling evenly.

Use was made of a grading scale of surface adhesiveness going from 0 (excellent) to 8 (zero surface adhesiveness).

| | |
|---|---|
| 0 | no attachment, no noise when the cards were separated (the cards slid on themselves) |
| 1 | noise, but no surface alteration |
| 2 | less than 10 points of pull-away over the entire surface |
| 3 | less than 50 points of pull-away |
| 4 | more than 50 points of pull-away, but no substantial localized pull-away |
| 5 | localized pull-away of the cardboard over less than 50% of the total surface |
| 6 | localized pull-away of the cardboard, from 20 to 50% |
| 7 | localized pull-away of the cardboard, greater than 50% |
| 8 | pull-away of the cardboard over the entire surface. |

The results of these three trials are given below:

| Paint | Film Formation | Gloss | Adhesiveness |
|---|---|---|---|
| according to the invention | good | 19.5% | 0 |
| according to prior art | poor | 19.0% | 0 |

These result indicate good performance of the two paints tested as regards gloss and adhesiveness. However, the advantage accrues to the paint which exhibits these properties when, addition, it easily forms a film at low temperature.

We claim:

1. A composite latex, the particulates of which having an average particle size ranging from 30 to 150 nm and comprising the amphiphilic copolymerizate, having a molecular weight ranging from 500 to 5,000, of the hydrophobic monomers styrene and (meth)acrylic ester(s) and a hydrophilic carboxylated comonomer, and the amount of amphiphilic copolymerizate ranging from 10% to 50% by weight of the dry solids content thereof.

2. Composite latex according to claim 1, wherein the copolymer having a molecular weight of between 500 and 5,000 is a copolymer of one or several hydrophobic monomers from the group comprising styrene or the derivatives thereof, isobutylene or the derivatives thereof, and (meth)acrylic esters, and of one or several hydrophilic monomers from the group comprising (meth)acrylic acid and maleic anhydride, the latter being potentially modified by an alcohol or an amine while remaining water-soluble or water-dispersible in an aqueous medium.

3. Composite latex according to claim 1, wherein the copolymer having a molecular weight of between 500 and 5,000 is a styrene/maleic anhydride copolymer.

4. Composite latex according to claim 1, wherein the copolymer having a molecular weight of between 500 and 5,000 is a styrene/maleic anhydride copolymer modified by partial esterification using C3–C18 linear aliphatic alcohols, cyclic alcohols, or alcohols produced by etherification of ethylene or propylene glycol.

5. Composite latex according to claim 1, wherein the copolymer having a molecular weight of between 500 and 5,000 is a styrene/maleic anhydride copolymer modified by partial amidation using at least one C3–C18 aliphatic amine, or at least one amine which carries both a primary and a tertiary amine.

6. Composite latex according to claim 1, wherein the hydrophobic monomers comprise styrene and the derivatives thereof, or (meth) acrylic esters, or a mixture of these monomers.

7. Composite latex according to claim 4, wherein said cyclic alcohols comprise cyclohexanol.

8. Composite latex according to claim 5, wherein said at least one C3–C18 aliphatic amine is cyclohexylamine.

9. Composite latex according to claim 8, wherein said tertiary amine is dimethylaminopropylamine.

10. A method of making solvent-free paints comprising using the composite latex according to claim 1.

11. Composite latex according to claim 5, wherein said amine which carries both the primary and the tertiary amine is dimethylaminopropylamine.

* * * * *